(12) United States Patent
Nass et al.

(10) Patent No.: US 8,023,440 B2
(45) Date of Patent: Sep. 20, 2011

(54) BINDING WIRELESS DEVICES IN A BUILDING AUTOMATION SYSTEM

(75) Inventors: Geoffrey D Nass, Rolling Meadows, IL (US); William Glaser, Buffalo Grove, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 1158 days.

(21) Appl. No.: 11/590,157

(22) Filed: Oct. 31, 2006

(65) Prior Publication Data

US 2008/0125057 A1  May 29, 2008

Related U.S. Application Data

(60) Provisional application No. 60/823,906, filed on Aug. 30, 2006.

(51) Int. Cl.
*H04W 4/00* (2009.01)
(52) U.S. Cl. ........ 370/310; 455/73; 455/41.2; 340/10.1; 340/10.3; 340/517; 340/3.5; 340/3.52; 700/276
(58) Field of Classification Search .................. 370/310, 370/343; 455/352, 132, 140, 73, 41.2; 340/10.1, 340/10.3, 517, 3.5, 3.52
See application file for complete search history.

(56) References Cited

U.S. PATENT DOCUMENTS

| | | | |
|---|---|---|---|
| 2002/0086567 A1* | 7/2002 | Cash, Jr. | 439/106 |
| 2002/0145394 A1 | 10/2002 | Morgan et al. | |
| 2003/0020595 A1* | 1/2003 | Wacyk | 340/3.5 |
| 2003/0061384 A1 | 3/2003 | Nakatani | |
| 2003/0067889 A1 | 4/2003 | Petite | |
| 2004/0008651 A1* | 1/2004 | Ahmed | 370/338 |
| 2004/0267385 A1 | 12/2004 | Lingemann | |
| 2005/0035717 A1* | 2/2005 | Adamson et al. | 315/150 |
| 2005/0222933 A1* | 10/2005 | Wesby | 705/36 |
| 2005/0288823 A1* | 12/2005 | Hesse et al. | 700/276 |
| 2006/0028997 A1* | 2/2006 | McFarland | 370/252 |
| 2006/0074494 A1* | 4/2006 | McFarland | 700/1 |
| 2006/0229746 A1* | 10/2006 | Ollis et al. | 700/65 |
| 2007/0109914 A1* | 5/2007 | McFarland | 367/128 |
| 2007/0162185 A1* | 7/2007 | McFarland | 700/258 |
| 2007/0232288 A1* | 10/2007 | McFarland et al. | 455/423 |
| 2009/0080347 A1* | 3/2009 | Ishii | 370/310 |
| 2009/0102640 A1* | 4/2009 | McFarland | 340/539.1 |

FOREIGN PATENT DOCUMENTS

| | | |
|---|---|---|
| CA | 2 236 569 A1 | 3/1998 |
| JP | 02 274089 A | 11/1990 |

OTHER PUBLICATIONS

U.S. Appl. No. 11/394,005, filed Mar. 30, 2006.

(Continued)

*Primary Examiner* — Pierre-Louis Desir

(57) ABSTRACT

Wireless transceivers connect with or in building automation components. The components are bound. Since the transceivers control the access media, the transceivers are likewise bound. The transceiver associated with a component queries the component for the component address. When a request from a controller addressed to the component is received, the transceiver for the component may recognize the component address. In response, the transceiver records the controller transceiver address in the request and transmits a response with the component transceiver address. Other features may assist in binding. For example, the controller transceiver distinguishes between components connected by wire from wireless. Only communications for wireless connections are transmitted. For example, if a binding is not used for an amount of time, the binding is removed. For example, a random or set order is used to avoid or minimize overlapping traffic for the responses for a binding list.

18 Claims, 3 Drawing Sheets

OTHER PUBLICATIONS

U.S. Appl. No. 11/403,711, filed Apr. 13, 2006.
U.S. Appl. No. 11/425,885, filed Jun. 22, 2006.
U.S. Appl. No. 11/425,901, filed Jun. 22, 2006.
U.S. Appl. No. 11/425,914, filed Jun. 22, 2006.
European Exam Report dated Dec. 21, 2009 for Reference No. 2006P18573EP.

* cited by examiner

BINDING WIRELESS DEVICES IN A BUILDING AUTOMATION SYSTEM

RELATED APPLICATIONS

The present patent document claims the benefit of the filing date under 35 U.S.C. §119(e) of Provisional U.S. Patent Application Ser. No. 60/823,906, filed Aug. 30, 2006, which is hereby incorporated by reference.

BACKGROUND

The present invention relates to building automation systems. In particular, binding allows optimized wireless communications between wireless devices in building automation and control systems.

Building automation systems may integrate heating, ventilation and air conditioning (HVAC) systems, security systems, fire systems, or other systems. The systems are typically formed from distributed components wired together. Controllers or field panels provide process controls based on sensor inputs to operate actuators. For example, a temperature sensor is read. An adjustment of a damper, heating element, cooling element or other actuator is determined based on a set point and the measured temperature. Other basic control functions for room comfort may be provided, such as by using single input, single output feedback loops employing proportional-integral-derivative methods. Panels or other controllers control distribution systems, such as pumps, fans or other central plants for cooling and heating. Management computers may also communicate with the field panels or other devices.

To communicate, the field panels are connected to the building automation components. For example, a wired RS-485 floor level network is created. Each floor level network includes multiple terminal equipment controllers of building automation components such as sensors or actuators, each with a specific address. Each component is manually assigned an address during installation, allowing the field panels to communicate with specific components of a larger number of components. Each component address is unique on the network or for a group of components connected with a field panel. Information from or for one component is distinguished from information for other components using the address. The controllers and building automation components are bound together by programming the addresses to be used.

To reduce costs associated with wiring, and for those cases where running wiring is impractical or impossible, wireless architectures for building automation systems have been proposed. Wireless standards provide single or multiple tier networks for implementing building automation processes. For example, a multi-tier wireless network emulates current wired building automation systems. A controller wirelessly communicates with sensors and associated actuators. The lower level sensors and actuators provide input and output functions controlled by controllers. Another example is the wireless architecture disclosed in U.S. Published Application 2006/0028997.

In a wireless system, the controllers and building automation components are bound together. Medium Access Control (MAC) addresses between two devices are exchanged so that the devices can communicate directly. However, if the building automation component does not have an address, the communications and binding may fail.

BRIEF SUMMARY

By way of introduction, the preferred embodiments described below include methods, computer readable media, and systems for binding wireless devices in building automation and control systems. Instead of wires, wireless transceivers are connected with or in building automation components. The components are bound, such as through manual or automatic programming. Since the wireless transceivers control the access media or communications, the transceivers are likewise bound. The transceiver associated with a component queries the component for the component address. The results of the query are used for binding. For example, when a request from a controller addressed to the component is received, the transceiver for the component may recognize the component address. In response, the transceiver records the controller transceiver address in the request and transmits a response with the component transceiver address.

Other features may assist in binding. For example, a controller may use wired and wireless communications. The controller transceiver distinguishes between components connected by wire from wireless. Only communications for wireless connections are transmitted to minimize wireless traffic. As another example, the use of bindings is monitored. If a binding is not used for an amount of time, the binding is removed. In another example, some broadcasts transmissions may request information from multiple devices. A random or set order is used to avoid or minimize overlapping traffic for the responses. These features alone or in combination with the querying or other features may be claimed independently.

In one aspect, a method is provided for binding wireless devices in building automation control. A building automation component is queried for a first address with a wireless transceiver having a second address. The wireless transceiver is connected by wire to the building automation component. At least the second address is transmitted wirelessly to a controller having a third address as a function of the querying. The third address of the controller is assigned to the wireless transceiver as a function of the querying.

In a second aspect, a building automation system is provided for binding of components. A first wireless transceiver has a first address. A second wireless transceiver has a second address. A building automation component has a third address. The first wireless transceiver connects with the building automation component for routing wireless communications to the building automation component. The first wireless transceiver is operable to request the third address from the building automation component. The first wireless transceiver is operable to bind to the second address as a function of the querying.

In a third aspect, a computer readable storage medium has stored therein data representing instructions executable by a programmed processor for binding in a wireless building automation system. The storage medium includes instructions for: receiving a wireless broadcast message with a first address requesting a building automation component associated with a second address, requesting a building automation component address from a connected building automation component, transmitting a third address for wireless communications binding if the building automation component address is the same as the second address, and assigning the first address for wireless communications associated with the building automation component.

In a fourth aspect, a method is provided for binding wireless devices in building automation control. A wireless transceiver connects with a controller. The controller communicates with at least a first building automation component using a wired connection. The controller communicates with at least a second building automation component using the wireless transceiver. Data for both the first and second building automation components are output to the wireless transceiver from the controller. Wireless communications from the wireless transceiver of the output data for the first building automation component are avoided. The communicating with the second building automation component is allowed.

The present invention is defined by the following claims, and nothing in this section should be taken as a limitation on those claims. Further aspects and advantages of the invention are discussed below in conjunction with the preferred embodiments and may later be claimed independently or in combination.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Wireless building automation control is provided for safety, environmental, security, hazard, combinations thereof, or other building systems. To use the wireless communications medium, transceivers are bound to each other. Each building automation component has an associated transceiver. For the controller to communicate wirelessly with another building automation component, the controller transceiver may not yet know the address of the component transceiver. The controller transceiver broadcasts the controller transceiver address along with the component address to all of the component transceivers on the network. Each component transceiver queries or previously queried the associated component for an address. The component transceiver that has a component with a matching component address responds back to the controller transceiver with the component transceiver address. In that way, the controller and component transceivers receive each other's addresses and automatically bind to each other for later communications.

In another embodiment, the binding is performed in response to a broadcast list of component addresses. Each component transceiver associated with one of the listed addresses responds. To avoid or reduce traffic on a wireless channel, some of the component transceivers respond at different times than others. For example, a component transceiver waits a random amount of delay before replying. As another example, different delays are programmed into different component transceivers. In another example, the list includes assigned delay or time slots for response. This embodiment may require fewer binding broadcast messages, especially when multiple component transceivers are to be bound to a given controller at the same time.

The binding for the building automation system is used to automatically bind the communications medium or transceivers. For example, each component is programmed with an address. A field panel or controller is programmed with the addresses of the components. Once connected or powered on, the component transceiver queries the component for the component address. The query is before or after receiving information from another component or controller with the address. The queried address is used to match the component transceiver with another transceiver.

Where the component address is not available or not programmed, the component transceiver does not receive a response to the query. The component transceiver may indicate a lack of address in response to a request. Since the communications binding is performed through the transceivers, communications about the lack of a component address may be performed.

Figure 1:
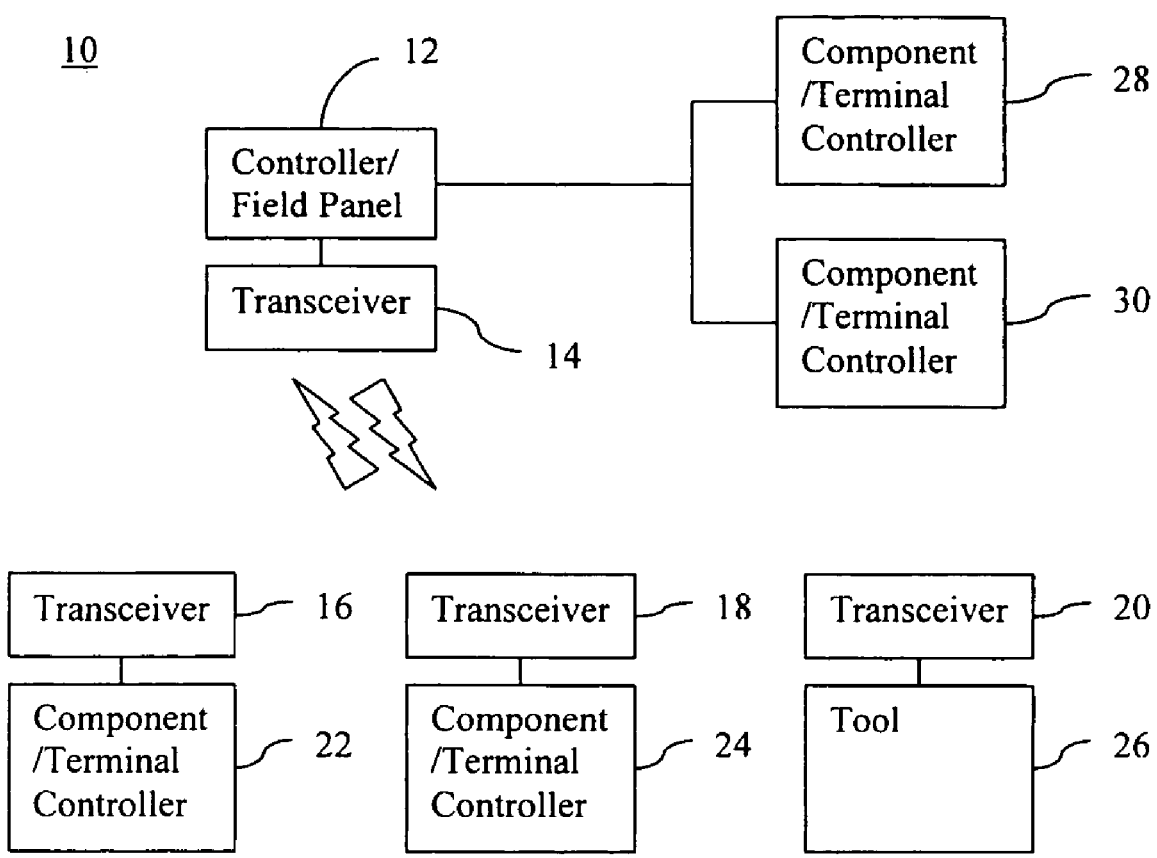
FIG. 1 is a block diagram of one embodiment of a wireless building automation system.

FIG. 1 shows a building automation system 10 for binding of components. The system 10 is a low level network in one embodiment, but may be a building level, combination of floor and building level, or other network grouping. In one embodiment, the network is configured as any now known or later developed building automation network. For example, one or more floor level networks connect with one or more building level controllers. A workstation or computer interface may be used to supervise or control the network or connected networks. In another embodiment, the networks or one of the networks disclosed in U.S. Published Application No. 2006/0028997, the disclosure of which is incorporated herein by reference, is used.

The network operates pursuant to a wireless communications protocols or stack. For example, the network operates pursuant to the 802.15.4 communications protocols (e.g., Ember's EmberNet 3.3.3 Wireless Stack), but Zigbee, 802.11x (e.g., 802.11a 802.11b, 802.11c . . . 802.11g), wifi, computer network, Ethernet, Bluetooth, proprietary, standard, now known or later developed wireless communication protocols may be used. The protocol defines medium access control and a physical interface to the wireless medium.

Any now known or later developed network and transport algorithms may be used for communicating between devices. Communication, transport and routing algorithms are provided on the appropriate devices. Any packet size or data format may be used.

Any of time division multiplexing, frequency division multiplexing, spread spectrum, code division multiplexing, dynamic collision avoidance, or other now known or later developed wireless interference avoidance schemes may be used. In one embodiment, the network uses collision avoidance by transmitting when a channel is clear with or without frequency modulation, such as carrier sense, multiple access division. Routing is performed using any protocol, such as a MESH routing or token.

Different frequencies, codes, or other communications differences may be used for different groups of components, such as by floor, by type (e.g., HVAC versus security or temperature versus airflow), or by other zones. By dividing portions of a larger network into smaller networks, the communications processing load may be minimized. Communications between different nodes on the network may then be performed by adjusting a transmit and/or receive function for communication with the node of interest. By providing differences in communications for different zones, different customers in the same building may be isolated using the same wireless network. Different types of systems may be isolated from each other as well. Alternatively, the systems or customers are integrated and operate together.

In one embodiment, information communicated within a network includes a network identification (e.g., group identification). Components associated with a same network identification operate or communicate together. For example, each transceiver includes a manual or programmed indication of a network identification. The components to operate together are set to the same identification. Within a same network or for different networks, different communications channels may be selected manually or by programming. For example, different frequency channels are selected manually or by programming to be used by a network. As another example, different network groupings are selected to use the same or different channels, such as two groupings per channel. In one embodiment, two manual inputs for controlling channel and group are provided, such as two 16 position switches.

The system 10 includes a network with a controller 12, a controller transceiver 14, other components 22, 24, 26, 28 and 30, and component transceivers 16, 18, and 20. Additional, different or fewer components may be provided. For example, additional controllers 12 are provided. As another example, a building level supervisory computer is provided. FIG. 1 shows two components 28, 30 connected by wires to the controller 12, but no, fewer or more components 28, 30 may be connected by wires, which forms a hybrid wired and wireless network.

The controller 12 is a building automation component. For example, the controller 12 is a field panel, a processor, a management processor, a computer, a sensor controlling an actuator, an actuator controlling a sensor, terminal equipment controlling itself, and/or other devices of a building automation network with a control process for itself or other components. For example herein, the controller 12 is an automation level field panel. One or more such field panel controllers 12 are positioned throughout a building, floor, or other region. Each controller 12 includes an application specific integrated circuit, general processor, digital signal processor, control processor, field programmable gate array, analog circuit, digital circuit, programmable power process language application, combinations thereof, or other now known or later developed device for monitoring, controlling and/or routing.

The controller 12 has an address. The address is assigned prior to, during, or after installation within a building. For example, the address is assigned during installation. The controller 12 also includes a binding table. The binding table lists all the components 22, 24, 26, 28, and/or 30 which the controller 12 controls or with which the controller 12 communicates. In one embodiment, the binding table includes up to 32 or other number of component address slots, at least one maintenance tool address slot, and the controller transceiver address. More, fewer, or different slots may be used. In other embodiments, one table or separate tables are provided for two or more networks with which the controller 12 communicates.

The controller 12 communicates with the components 22, 24, 28 and 30. Any communications protocol may be used, such as a master/slave protocol where the controller 12 controls any number of other components 22, 24, 28, and 30 (e.g., 32 on each network controlled by the controller 12). Alternatively or additionally, the controller 12 routes data from the components 22, 24, 28, and 30 to other devices, such as a supervisory/management computer or other controllers. The individual controller 12 or networks of the controllers 12 implement control processes for a plurality of local areas, such as a plurality of rooms. The control processes may be implemented for a room, region, wing of the building, a floor of the building, an entire building, other areas, or combinations thereof. The controller 12 operates with sensors, actuators, or other terminal equipment to control building automation. Alternatively or additionally, the controller 12 only overrides local control.

The controller 12 is operable to assign bindings, automatically bind, and/or reassign bindings. Dynamic binding between any of the sensors, actuators, or other devices with one or more controllers 12 is provided. A binding is created as needed for implementing a particular control function or process. Other bindings may subsequently be created between different devices or with different controllers 12 as needed, such as for implementing different control functions. The controller 12 may be assigned to specific components 22, 24, 28, and 30, so the controller 12 binds with or is bound to the components 22, 24, 28, and 30. The bindings are programmed into the controller 12, such a user entering a list of components 22, 24, 28, and 30.

The controller 12 has one or more outputs and/or inputs. For example, a plurality of RS-485 ports is provided. The same information is output on all or some of the ports. FIG. 1 shows use of two outputs. One output is connected as a wired network with the components 28 and 30, and the other output is connected to the transceiver 14. Different information may be output to different ports in other embodiments.

The transceiver 14 is operable to transmit and receive data pursuant to the network protocol. The transceiver 14 includes an antenna, transmitter, receiver, memory, LEDs, visual output, data output port, input cable, and processor. Additional, different or fewer devices may be provided, such as a data input port, and/or network/channel switches. The transceiver 14 is operable to send and/or receive information to and/or from any of the other transceivers 16, 18, and 20. The information may be addressed to a specific one or ones of the transceivers 16, 18, and 20 and/or components 22, 24, and 26. Broadcast messages may also be sent. The transceiver 14 may be a full function device pursuant to the 802.15.4 standard, or include other functionality.

The transceiver 14 has an address. The address is different than the address of the controller 12. The transceiver address is programmed prior to, during, or after installation in a building. In one embodiment, the transceiver address is set during manufacture. The transceiver 14 may include a binding table of other transceivers 16, 18, and/or 20 with which the transceiver 14 communicates. 32 or other number of slots are provided. Other address slots may be included, such as a multicast slot, a maintenance tool slot, and/or misconfigured or swapping slots. The multicast slot corresponds to a default for broadcast communications to unbound components 22, 24, and 26.

The transceiver 14 includes a cable, electrical trace, wire or other device for connection with the controller 12. The connection is a wired connection. In one embodiment, the transceiver 14 is a separate device, such as having a separate housing or being on a separate board, than the controller 12. Alternatively, the transceiver 14 is part of the controller 12, such as being within a same housing or on a same circuit board.

The transceiver 14 generates a wireless communication message or package for data output by the controller 12. The controller 12 may be bound to the components 22, 24, 26, 28, and/or 30. The communications to the components 22, 24, 26, 28, and/or 30 include the component address and may include the address of the sending controller 12. The transceiver 14 may add the transceiver address or replace the controller address with the transceiver address.

The transceiver 14 is able to wirelessly broadcast data including the controller address. The data includes one or more component addresses, such as a list of component addresses for binding the corresponding component transceivers 16, 18, and/or 20. The data is transmitted with minimal delay, such as less than one millisecond. Alternatively, delay is provided.

In one embodiment, the transceiver 14 receives communications addressed for components 28 and 30 for which the transceiver 14 does not handle communications. The transceiver 14 includes a list of bound transceivers 16, 18, and/or 20, and/or associated components 22, 24, and/or 26 with which the transceiver 14 communicates. For example, the binding address table is used. Alternatively, the list is of components 28 and/or 30 for which the transceiver 14 does not communicate. Any list differentiating wireless and wired communications between the controller 12 and the building automation components 22, 24, 26, 28, and/or 30 may be maintained. Using the list, the transceiver 14 distinguishes between wired and wireless communications. For wireless communications, the transceiver 14 wirelessly transmits the communications. For wired communications, the transceiver 14 does not transmit. Alternatively, the transceiver 14 does not distinguish between types of connection and transmits signals for any communications received from the controller 12.

The building automation components 22, 24, 26, 28, and/or 30 are the same or different types of components. Building automation components 22, 24, 26, 28, and/or 30 include terminal controllers, sensors, actuators, controllers, or other devices. Other devices include personal computers, panels, or monitors. Sensors may be a temperature sensor, humidity sensor, fire sensor, smoke sensor, occupancy sensor, air quality sensor, gas sensor, $CO_2$ or CO sensor or other now known or later developed sensors, such as an oxygen sensor for use in hospitals. Micro-electro-mechanical sensors or larger sensors for sensing any environmental condition may be used. Actuators control building wide components, such as a chiller, boiler, building intake vent, or building air flow out take vent, or local components, such as a damper, heating element, cooling element, sprinkler, or alarm. Actuators include a valve, relay, solenoid, speaker, bell, switch, motor, motor starter, damper, pneumatic device, combinations thereof, or other now known or later developed actuating devices for building automation. In another example, the component 26 is a maintenance tool, such as a wireless computer.

The components 22, 24, 26, 28, and/or 30 include memories and processors. The processor responds to and generates requests. The memory includes address information. For example, each component 22, 24, 26, 28, and/or 30 is assigned a different address prior to, during, or after installation. The address is entered manually or electronically. In one embodiment, an installer programs the address with a wireless or wired tool. The memory may include a binding table. The binding table includes the address of any controller or other component bound to the component 22, 24, 26, 28, and/or 30. Other address slots may be provided, such as addresses of the transceiver 16, 18, and/or 20 connected with the component 22, 24, and/or 26, and/or a default network address.

In one embodiment, the transceivers 16, 18, and 20 operate as full function devices of 802.15.4 allowing for dynamically assigned communications with different devices over a single or multiple communications path. One or more transceivers 16, 18, or 20 may be reduced functionality devices of 802.15.14.

The component transceivers 16, 18, and 20 are the same or different types of transceivers than discussed above for the controller transceiver 14. The component transceivers 16, 18, and 20 connect with the corresponding components 22, 24, and 26. The connection is wired, such as a cable, signal trace, wire, or other conductor. In one embodiment, the component transceivers 16, 18, and 20 connect with cables to communications ports on the components 22, 24, and 26. For example, the transceivers 16, 18, and 20 are in separate housings and connect with the components 22, 24, and 26, which are otherwise usable in a wired network. In other embodiments, the transceivers 16, 18, and 20 connect with the components 22, 24, and 26 by being designed or made as part of a same device, such as in the same housing and/or on a same circuit board. The transceivers 16, 18, and 20 route wireless communications to and from the building automation components 22, 24, and 26.

The transceivers 16, 18, and 20 include respective memories and processors. The memory may be smaller where fewer bindings are to be used. For example, the memory stores an address of the transceiver 16, 18, 20. The transceiver address is preprogrammed, such as during manufacture, or may be programmed during or after installation. The memory also stores the address of the connected component 22, 24, and/or 26. The memory may store other addresses, such as for a multicast (default) communications, for one or more bound controllers 12, one or more bound maintenance tools 26, other components 22, 24, 28, and/or 30, and/or associated transceivers. In one embodiment, the addresses are for the associated transceivers and not the connected components other than the immediately connected component.

The processor of the transceiver 16, 18, 20 requests the address of the connected component 22, 24, 26. The request is formatted pursuant to the data format or standard used for the network. The request does or does not include the address of the transceiver 16, 18, 20. The request is triggered by a request from another transceiver 12, 16, 18, 20, or from another component 12, 22, 24, 26, 28, 30. Alternatively, the request is triggered after powering on or initializing the transceiver 16, 18, 20, or after a delay.

The processor also establishes communications links or binds as a function of the queried address. By matching addresses, the binding occurs. The processor routes communications, generates access media related communications, and/or reformats data. For example, the processor controls access media characteristics, such as increasing or decreasing transmitted power, changing a frequency, setting a data format, setting an interference avoidance technique or other transmission or reception property either automatically or in response to control signals.

The tool 26 is a component for maintenance of the network or components of the network. In one embodiment, the tool 26 is a computer, personal data assistant, or other device for connecting with components. In another embodiment, the tool 26 is a wireless device as shown in FIG. 1, such as the tool described in U.S. Published Application Nos. 20070232288, 20070241866, 20070241877, 20070241878 and 20070241879 (Ser. Nos. 11/394,005, 11/403,711, 11/425,885, 11/425,901 and 11/425,914), the disclosures of which are herein incorporated by reference.

The tool 26 is used to monitor communications, test automation performance, assign addresses, alter bindings, resolve problems, reset components, or for other automation network related activity. When connected, the tool 26 acts as a master for one embodiment of communications with components, but other communications protocols may be used. For wireless use, the tool 26 may bind with one or more other components 12, 22, 24, 26. The binding is performed during use of the tool 26. The associated transceivers 14, 16, or 18 also bind with the transceiver 20 for communications. For example, the tool 26 performs the binding process implemented by the controller 12 to bind with one or more other components 12, 22, 24, and/or 26. The tool 26 may be portable, so may bind with different components or no component at different times.

For disconnecting the tool 26, removal of other components 12, 22, or 24, or replacement, the usage of the bindings is tracked. Each transceiver 14, 16, 18, and 20 monitors use of each binding other than any default (e.g., multicast) binding. Bindings not used over a threshold time, such as over 10 minutes, are removed. The removal may indicate an error or problem in the communications path or with an associated device (transceiver or component). Alternatively, the binding may be tested after the threshold time. The binding is removed upon failure of the test. For example, the tool 26 is turned off. The associated binding is not used. After a time period or test, the binding is removed. The binding is removed by deleting the corresponding addresses from memory. The assigned memory location may then be used for another binding with the same or different component.

To implement a control function or processes, the controller 12, components 22, 24, 28, and/or 30 are bound together. Sensors and actuators are bound to the controller 12. The controller 12 receives information from the sensor and outputs information to the actuator. Alternatively, sensor arrangements are bound to actuator arrangements without binding to a controller. One or two-way communications are provided using the binding.

To manage the access medium, the related transceivers 14, 16, 18, and 20 are also bound. For example, a wired network is replaced with wireless communications. A field panel wireless transceiver ("FPX") is connected to the field panel, and a floor level device wireless transceivers ("FLNX") are connected to each terminal equipment controller ("TEC") on the wireless network. Both the FPX and FLNX may be RS-485 to wireless transceiver connections, and all of the FPX and FLNX devices form a "mesh" of nodes that communicate wirelessly by routing wireless messages to each other using each FPX or FLNX node's medium access control ("MAC") addresses.

In order for the field panel to communicate with its TEC's, the FPX at the field panel communicates wirelessly with the FLNX's at the TEC's, and the FPX and FLNX devices exchange their MAC addresses for this to occur. The process of MAC address exchanging (binding) between the FPX and FLNX devices is automatic, and transparent to the field panel and TEC devices. The field panel and TEC devices may have no knowledge about FPX and FLNX MAC addresses, allowing use of the same field panel and TEC devices with wired or wireless networks.

The instructions for implementing the processes, methods and/or techniques discussed herein are provided on computer-readable storage media or memories, such as a cache, buffer, RAM, removable media, hard drive, or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts, or tasks are independent of the particular type of instructions set, storage media, processor, or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through the network. In yet other embodiments, the instructions are stored within a given computer, CPU, GPU, transceiver, component, controller, or system.

The instructions are different for the different transceivers. For example, the transceiver 14 associated with the controller 12 operates differently than the transceivers 16, 18, and 20 for other components 22, 24, and 26. The controller transceiver 14 operates with a larger number of addresses due to binding with multiple (e.g., 32) components 22, 24, and 26, so includes instructions for requesting or initiating binding. The controller transceiver 14 sequentially establishes bindings. Alternatively, the controller transceiver 14 broadcasts a request with a list of components 22, and 24 for wireless binding. Once a response is received identifying the component transceiver associated with the requested component or components, the controller transceiver stores or assigns the component transceiver addresses associated with the specific components 22, 24, binding the controller transceiver 14 to the component transceivers 16, 18.

In one embodiment of instructions for component transceivers 16, 18, 20, the instructions are for receiving a wireless broadcast message with a controller transceiver address requesting a building automation component associated with a component. The request may include a list of component addresses. The component transceiver requests a building automation component address from a connected building automation component. If the connected component address matches the requested component address or one of the requested component addresses from the list, the component transceiver transmits the component transceiver address for wireless communications binding. To reduce interference, especially for the broadcast list, the response due to a match may be delayed. For example, at least a partially random delay is implemented before responding. As another example, the list includes delay assignments with different delay assignments for different components. As another example, a combination of both types of delay or other delays may be used. If a match occurs, the component transceiver also assigns the controller transceiver address for wireless communications associated with the building automation component. The component transceiver binds to the controller transceiver.

Other architectures and associated binding may be used, such as binding the component transceivers 16, 18 to more than one other transceiver 14, 20. The bindings may occur without a designated controller transceiver 14, such as implementing bindings directly between components 22, 24 to operate without control by the controller 12. The instructions also include tracking usage of the bindings and unbinding for lack of usage.

In one embodiment, the firmware for the transceiver communications is run as a single thread. Port processing for the RS-485 or communications with the attached devices is handled character-by-character (non-blocking) to allow the wireless communications stack time to process and avoid tripping any error timers. Configuration constants (e.g., address) are hard-coded in a memory, such as flash memory, and token values use an EEPROM memory. Other approaches may be used.

Figure 2:
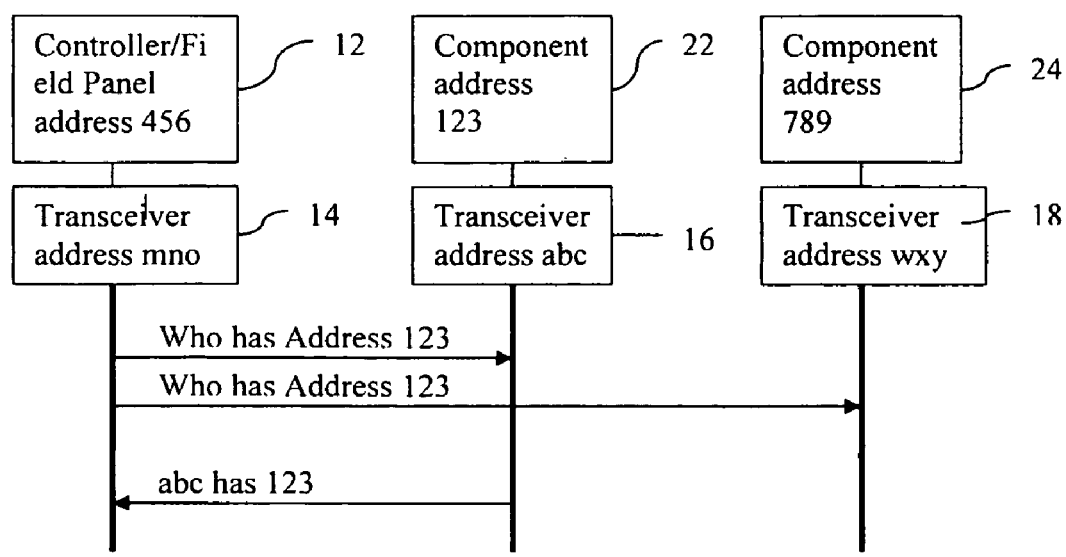
FIG. 2 is a graphical representation of one embodiment of a method for binding in a wireless building automation system.
Figure 3:
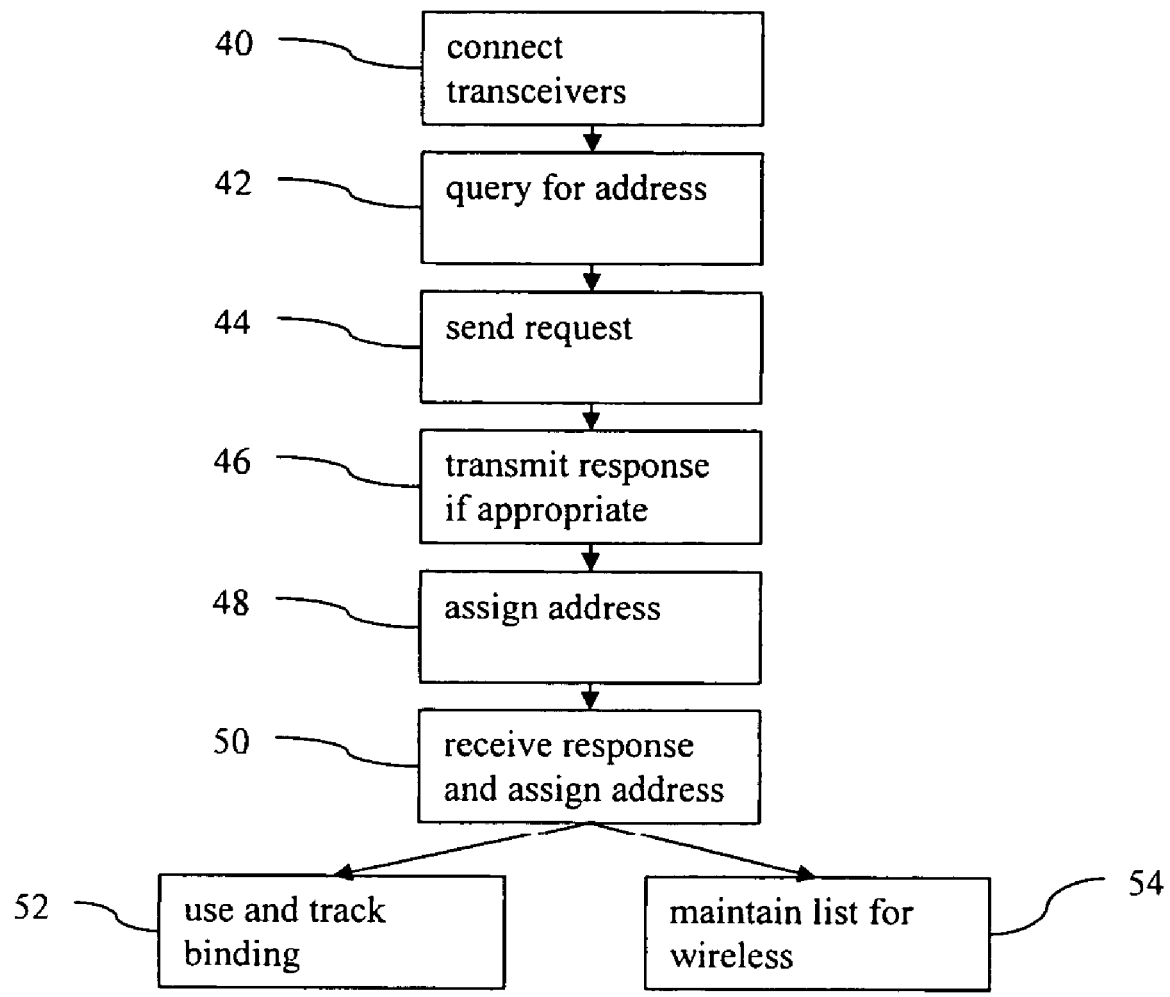
FIG. 3 is a flow chart of an embodiment of a method for binding in a wireless building automation system.

FIGS. 2 and 3 show a method for binding wireless devices in building automation control. FIG. 2 graphically represents the acts 44 and 50 of FIG. 3. The system of FIG. 1 or a different system is used. Additional, different, or fewer acts than shown in FIG. 3 may be used. For example, act 54 is optional. The acts are performed in the order shown or a different order. For example, act 42 is performed before or after act 44. For after act 44, receipt of a request or other event is used to trigger the query of act 42. Other triggers are used for performance before act 44.

In act 40, wireless transceivers are connected to their respective components. The wireless transceivers are connected by plugging a cord into a component during installation or plugging a cord into the transceiver. For example, the wireless transceiver includes a cord for connecting with a wired jack or port on the component. In other embodiments, the wireless transceivers are connected with the components during manufacture, such as the transceiver being part of the component. The connection allows communications between the wireless transceiver and the connected component. The wireless transceiver may be adjacent to the component or spaced from the component for better wireless reception.

The components have previously assigned or programmed addresses. The addresses are set manually with switches, programmed (e.g., assigned after or during installation), or assigned during manufacture. Some components may not have addresses.

In act 42, the wireless transceiver queries the connected building automation component for the component address. The wireless transceiver has a transceiver address. The query is formatted pursuant to a communications protocol, such as used for the component. In one embodiment, a "who are you" type communications is used. Different queries may be performed.

The query is performed in response to a wireless broadcast of act 44 or other trigger. For example, the query is performed after initialization of the component transceiver but before receiving a binding request from another transceiver or controller. The query is repeated until a response is received or a threshold number of attempts are made.

Each transceiver queries any connected components. The transceiver stores the addresses of the connected components for comparison or use in routing communications.

In act 44, a binding request is sent from one transceiver to another transceiver. The binding request is generated after initialization. In one embodiment, the binding request is generated each time a connected component outputs a communication for a component without an established binding. The component address for the component to receive the message is extracted from the message and compared to a binding table. If there is no associated binding, a binding request is sent. In another embodiment, the binding request is generated in response to an output list of components bound to the connected component. For example, the connected transceiver requests the list from the connected component, or the connected component outputs the list for other purposes. In response to receiving the list, the connected transceiver may request the transceiver addresses associated with the listed components.

Since the request is associated with transceivers not yet bound to the generating transceiver, the request is addressed to a default (broadcast) address. The same or different default addresses are provided for the various transceivers of the network. For example, the default address is based, at least in part, on the group or network identification setting. The default address is associated with a broadcast. The message is addressed to all or any of the transceivers using the default. The message is not specific to a particular transceiver even if specific to a particular component. Other limits on communications may be provided, such as not allowing field panel-to-field panel wireless communications.

In one embodiment of act 44 represented in FIG. 2, to establish communications links, the controller transceiver 14 uses a default address to communicate. A request includes the default address for both transceivers 16, 18. The request includes the component address, such as 123.

In act 46, a response is transmitted if appropriate. The component transceiver that receives the request compares the connected component address to the component address or addresses of the request. If the connected component address matches an address of one of the requested components, a response is transmitted. In the example of FIG. 2, transceiver 18 matches the 123 component address of the request with the 123 component address of the connected component 22. The transceiver 18 does not match the 123 component address of the request with the 789 component address of the connected component 24. The matching transceiver 16 replies with the transceiver address, such as abc. In this example, the reply is transmitted to the transceiver 14 of the controller 12, but may be a reply to another component or the controller 12.

The receiving transceivers 16, 18 with matches respond back with a particular address for the transceiver 16, 18, 20. To distinguish which path or pair of transceivers is to be used for which component 12, 22, 24, or 26, the component address is used. For example, the transceiver 14 transmits the binding related request with one or more addresses of components 22, 24 to be controlled by the controller 12. The transceivers 16, 18, and 20 match the component addresses to the queried address of the connected component 22, 24. If the addresses match, the transceiver 16, 18 responds with the transceiver address associated with the component address and stores the controller transceiver address. The reply transmission is performed as a function of the querying so that the addresses may be matched.

Each connection is formed sequentially. The request and reply of acts 44 and 46 are performed as needed for the controller 12 or other component. Alternatively, the request of act 44 includes a list of components. The component transceivers 16, 18 with matches reply. The replies may be performed as available using the medium access protocol. Alternatively or additionally, the replies are likely spaced apart in time, such as by using a random delay. Each matching transceiver selects a random delay, such as a number within a range two or more times larger than the number of components on a given network and/or communications channel. Other delays may be used, such as providing an assigned delay in the list corresponding each component address listed. In a combination, assigned delays or weights are used with random delay.

If the response to a query to a connected component is no address or an indication of no address available, the connected transceiver 16 may still communicate using the default address or the controller transceiver address received with the request. This allows communication of the need to assign an address to the connected component. An address may then be assigned to the connected component. When binding is attempted again, such as in response to a reset at the controller, a component address is available. The address of the responding transceiver or the default address may be used for subsequent communications.

In act 48, the address of the requesting transceiver, such as the controller transceiver address, is assigned as a function of the matching. Due to the querying and associated match, the matched component transceiver extracts the address of the requesting transceiver from the request. The address is stored as a binding. The binding for communications from the component transceiver to the controller transceiver is established by saving and using the address of the controller transceiver from the request. The assignment is performed by the transceiver. A separate or same binding may be used for the connected components, such as the controller 12 and the other component.

In act 50, the controller or requesting transceiver receives the reply. The transceiver extracts the address of the responding transceiver. The address of the connected component to the responding transceiver may also be extracted. The address of the responding transceiver is assigned to the communications path between controller and the component. The requesting transceiver stores the responding transceiver address as associated with the component connected with the responding transceiver. The communications provide the corresponding addresses to the transceivers. As a result, the controller transceiver is bound to the transceivers by storing the addresses. If more than one reply is received, an error output may be generated and further communications for that address blocked.

The communications may be multi-purpose. For example, the binding occurs without special requests and/or responses specifically for binding. Instead, the binding occurs while routing communications between the controller and the components. The address information is extracted from the communications. The communications are also routed to the connected component and/or the controller for performance pursuant to the building automation protocol. Alternatively, specific requests and/or responses are provided for binding.

In act 52, the bindings are used. Subsequent transmissions are addressed to one or more specific transceivers. To minimize processing, each transceiver checks the address associated with a received communication. If addressed to the transceiver, the communication is processed by the transceiver. If appropriate, the transceiver responds. If appropriate, the transceiver routes the communication to the connected component and responds after receiving information from the connected component.

The usage of the bindings may be tracked. For example, the controller transceiver and/or component transceivers track usage for assigned bindings. If the bindings or addresses are not used over a time period, such as 10 minutes, the bindings may be removed and/or an error communication sent. Unbinding for lack of usage makes the address slot available for other transceivers, such as replacement transceivers. For example, a service tool transceiver binds to a particular transceiver for maintenance of the transceiver or the connected component. After completion of the maintenance, the binding is not used. By unbinding, the service tool address slot is made available to later binding to the same or different service tool. Other unbinding may be provided, such as unbinding in response to an instruction to unbind or in response to another binding request.

In act 54, a list is maintained to differentiate wireless and wired communications between the controller and a plurality of building automation components. For example, FIG. 1 shows two components 28 and 30 connected by wires to the controller 12, but other components 22, 24, and 26 use wireless communications. The controller 12 may or may not output the same information regardless of the type of connection. The transceiver 14 may seek binding and/or communication with transceivers for components that do not have wireless transceivers. To avoid this binding, the list is used to identify components with transceivers. If a component is connected by wires, the controller transceiver avoids transmission. If the component uses wireless communication, the controller transceiver transmits the information.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for binding wireless devices in building automation control, the method comprising:
   querying a building automation component for a first address with a wireless transceiver having a second address, the wireless transceiver being connected to the building automation component via a wired communication connection and wherein the wireless transceiver queries the building automation component for the first address via the wired communication connection;
   transmitting at least the second address wirelessly to a controller having a third address as a function of the querying;
   assigning the third address of the controller to the wireless transceiver as a function of the querying;
   maintaining data differentiating wireless and wired communications between the controller and a plurality of building automation components including the building automation component; and
   wirelessly transmitting communications associated with wireless communications and not wirelessly transmitting communications associated with wired communications.

2. The method of claim 1 wherein assigning comprises assigning by the wireless transceiver; and
   further comprising:
   assigning, by the controller, the second address to a communications path between the controller and the building automation component having the first address.

3. The method of claim 1 wherein querying is performed in response to a wireless broadcast of the first address, and wherein transmitting and assigning are performed where the building automation component has an address matching the first address.

4. The method of claim 1 wherein querying is performed in response to a wireless broadcast of the first address and a plurality of other building automation component addresses, and wherein transmitting and assigning are performed where the building automation component has an address matching the first address.

5. The method of claim 4 wherein transmitting comprises transmitting as a function of an at least partially random delay, a received time assignment, or combinations thereof.

6. The method of claim 1 wherein querying comprises querying prior to receiving a binding request from the controller.

7. The method of claim 1 further comprising:
   receiving a response to the querying corresponding to no address for the building automation component; and
   assigning the first address or a fourth address to the building automation component.

8. The method of claim 1 further comprising:
   tracking usage of a binding associated with the second address; and
   unbinding for lack of usage.

9. A building automation system for binding of components, the system comprising:
   a first wireless transceiver having a first address; a second wireless transceiver having a second address; a building automation component having a third address, the first wireless transceiver connected with the building automation component for routing wireless communications to the building automation component, wherein the first wireless transceiver is operable to request the third address from the building automation component and wherein the first wireless transceiver is operable to bind to the second address as a function of the a query from the second wireless transceiver;

wherein the building automation component has a wired connection with the first wireless transceiver, and the second wireless transceiver has a wired connection with a controller having a fourth address, the fourth address bound to the third address;

wherein the second wireless transceiver is operable to maintain data differentiating wireless and wired communications between a controller and a plurality of building automation components including the building automation component, and is operable to wirelessly transmit communications associated with wireless communications and not wirelessly transmit communications associated with wired communications.

10. The system of claim 9 wherein the second wireless transceiver is operable to wirelessly broadcast data including the third address, and wherein the first wireless transceiver is operable to bind as a function of the data where the third address matches the data.

11. The system of claim 9 wherein the second wireless transceiver is operable to wirelessly broadcast a list of addresses including the third address, and wherein the first wireless transceiver is operable to bind where the list includes the third address.

12. The system of claim 11 wherein the first wireless transceiver is operable to transmit a response to the broadcast list, the response including the first address and being with an at least partially random delay, a received time assignment, or combinations thereof.

13. The system of claim 9 wherein the first wireless transceiver, second wireless transceiver or both are operable to track usage of a binding associating the first and second addresses and unbind for lack of usage.

14. In a computer readable non-transitory storage medium having stored therein data representing instructions executable by a programmed processor for binding in a wireless building automation system, the non-transitory storage medium comprising instructions for:

receiving a wireless broadcast message with a first address requesting a building automation component associated with a second address;

requesting a building automation component address from a connected building automation component;

transmitting a third address for wireless communications binding if the building automation component address is the same as the second address;

assigning the first address for wireless communications associated with the building automation component;

maintaining data differentiating wireless and wired communications between the controller and a plurality of building automation components including the building automation component; and wirelessly transmitting communications associated with wireless communications and not wirelessly transmitting communications associated with wired communications.

15. The computer readable non-transitory storage medium of claim 14 wherein assigning the first address comprises assigning a wireless transceiver of a controller, the wireless transceiver of the controller having the first address;

further comprising instructions for:
assigning, at the wireless transceiver of the controller, the third address for wireless communications with the building automation component.

16. The computer readable non-transitory storage medium of claim 14 wherein receiving comprises receiving a list of addresses, wherein transmitting and assigning are performed where the list includes the second address, and wherein transmitting comprises transmitting a response to the list, the response including the third address and being with an at least partially random delay, a received time assignment, or combinations thereof.

17. The computer readable non-transitory storage medium of claim 14 further comprising tracking usage of a binding associating the first and third addresses and unbind for lack of usage.

18. A method for binding wireless devices in building automation control, the method comprising:

connecting a wireless transceiver with a controller;

communicating, by the controller, with at least a first building automation component using a wired connection;

communicating, by the controller, with at least a second building automation component using the wireless transceiver;

outputting, to the wireless transceiver, data for both the at least first and second building automation components from the controller;

avoiding wireless communications from the wireless transceiver of the output data for the at least first building automation component; and allowing the communicating with the at least second building automation component;

maintaining data differentiating wireless and wired communications between the controller and a plurality of building automation components including the building automation component; and wirelessly transmitting communications associated with wireless communications and not wirelessly transmitting communications associated with wired communications.

* * * * *